(12) United States Patent
Anderson et al.

(10) Patent No.: US 11,205,147 B1
(45) Date of Patent: Dec. 21, 2021

(54) SYSTEMS AND METHODS FOR VENDOR INTELLIGENCE

(71) Applicant: Wells Fargo Bank, N.A., San Francisco, CA (US)

(72) Inventors: Ryan Anderson, Waxhaw, NC (US); Bryan Kroll, San Mateo, CA (US); Abhijit Rao, Irvine, CA (US); Priyamvada Singh, San Francisco, CA (US); Masoud Vakili, Los Altos, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 284 days.

(21) Appl. No.: 15/909,234

(22) Filed: Mar. 1, 2018

(51) Int. Cl.
*G06Q 10/06* (2012.01)
*G06F 16/93* (2019.01)
*G06F 16/904* (2019.01)
*G06F 16/951* (2019.01)

(52) U.S. Cl.
CPC ..... *G06Q 10/06393* (2013.01); *G06F 16/904* (2019.01); *G06F 16/93* (2019.01); *G06F 16/951* (2019.01)

(58) Field of Classification Search
CPC . G06Q 10/06393; G06F 16/93; G06F 16/904; G06F 16/951
USPC ....................................................... 705/7.39
See application file for complete search history.

(56) References Cited

U.S. PATENT DOCUMENTS

| 7,493,403 B2 | 2/2009 | Shull et al. |
| 7,987,500 B2 | 7/2011 | Rosenberg et al. |
| 8,301,563 B2 * | 10/2012 | Silvera .................. G06Q 10/10 705/42 |
| 8,682,702 B1 | 3/2014 | Plummer et al. |
| 8,682,708 B2 | 3/2014 | Cerminaro |
| 9,223,849 B1 | 12/2015 | Bilinski et al. |
| 9,363,283 B1 | 6/2016 | Herrera-Yague et al. |
| 9,679,254 B1 | 6/2017 | Mawji et al. |
| 9,785,982 B2 * | 10/2017 | Saito ...................... G06Q 40/02 |
| 10,127,578 B2 * | 11/2018 | Greenough ........ G06Q 30/0261 |
| 2002/0072953 A1 * | 6/2002 | Michlowitz ............ G06Q 10/06 705/7.39 |
| 2002/0188617 A1 * | 12/2002 | Smith ................. H04L 61/1523 |

(Continued)

OTHER PUBLICATIONS

Birsen Karpak, "An Application of Visual Interactive Goal Programming: A Case in Vendor Selection Decisions", Journal of Multi-Criteria Decision Analysis J. Multi-Crit. Decis. Anal. 8: 93-105 (1999) (Year: 1999).*

(Continued)

*Primary Examiner* — Rutao Wu
*Assistant Examiner* — Abdallah A El-Hage Hassan
(74) *Attorney, Agent, or Firm* — Foley & Lardner LLP (57) ABSTRACT

A computing system includes a network interface configured to communicate data over a network, a vendor database configured to retrievable store vendor data related to a vendor of interest, and a processing circuit with a processor and memory. The memory is structured to store instructions that are executable by the processor and cause the processing circuit to identify a vendor of interest; conduct a search of internal documents and external resources to obtain the vendor data related to the vendor of interest, store the vendor data in the vendor database, and generate a vendor performance score based on the vendor data.

16 Claims, 6 Drawing Sheets

(56) References Cited

U.S. PATENT DOCUMENTS

| | | | |
|---|---|---|---|
| 2008/0033775 A1 | 2/2008 | Dawson et al. | |
| 2009/0030751 A1 | 1/2009 | Barve et al. | |
| 2009/0030881 A1* | 1/2009 | Hoile | G06F 16/95 |
| 2009/0276233 A1* | 11/2009 | Brimhall | G06Q 30/02 |
| | | | 705/38 |
| 2009/0276257 A1* | 11/2009 | Draper | B25J 9/06 |
| | | | 705/7.28 |
| 2010/0325107 A1* | 12/2010 | Kenton | G06Q 30/00 |
| | | | 707/723 |
| 2012/0047014 A1* | 2/2012 | Smadja | G06Q 30/0255 |
| | | | 705/14.53 |
| 2013/0125222 A1 | 5/2013 | Pravetz et al. | |
| 2013/0211872 A1 | 8/2013 | Cherry et al. | |
| 2014/0032285 A1* | 1/2014 | Killoran | G06Q 20/3276 |
| | | | 705/14.4 |
| 2014/0074549 A1* | 3/2014 | Chugh | G06Q 30/02 |
| | | | 705/7.29 |
| 2014/0105508 A1* | 4/2014 | Arora | G06K 9/72 |
| | | | 382/218 |
| 2014/0278730 A1* | 9/2014 | Muhart | G06Q 10/0635 |
| | | | 705/7.28 |
| 2015/0213456 A1* | 7/2015 | Wiltzius | G06Q 30/018 |
| | | | 705/317 |
| 2016/0344544 A1 | 11/2016 | Biesinger et al. | |
| 2017/0068866 A1* | 3/2017 | Kostyukov | G06K 9/18 |
| 2018/0082237 A1* | 3/2018 | Nagel | G06Q 10/06393 |

OTHER PUBLICATIONS

Christine Koh, "Managing Vendor-Client Expectations in IT Outsourcing: A Psychological Contract Perspective", Association for Information Systems AIS Electronic Library (AISeL). 1999 (Year: 1999).*

Abeed Sarker, "An unsupervised and customizable misspelling generator for mining noisy health-related text sources" Journal of Biomedical Informatics, 88 (2018) 98-107 (Year: 2018).*

* cited by examiner

SYSTEMS AND METHODS FOR VENDOR INTELLIGENCE

TECHNICAL FIELD

Embodiments of the present disclosure relate generally to the field of automated computing systems for aggregating and analyzing data relating to vendor performance.

BACKGROUND

Large companies are generally made up of many separate business units, often with limited communication or coordination occurring amongst them. Each business unit engages outside vendors to provide services to the corporation. Traditionally, difficulties in communication amongst business units results in a lack of shared knowledge about the company's history with a particular vendor or prospective vendor. In such a situation, data relating to the company's relationship with a vendor is scattered throughout many different computing systems, devices, applications, file formats, and databases used by the company and its employees. In this regard, the requirement of large amounts storage space and the operation of multiple applications on various company and personal computing devices at the same time can strain a company's computing systems. In addition, because of the difficulty in gaining a comprehensive understanding of the data scattered throughout a company's computing systems, one business unit may hire a vendor who has a history of poor performance with the company, pass up a vendor with a history of great performance with the company, unnecessarily duplicate purchases or negotiations, or waste resources analyzing potential vendors that have already by vetted by another business group. Even where a central administrative department handles vendor contracting paperwork, conventional vetting and selection of outside vendors in large companies fails to leverage the full potential of the data generated by diverse computing systems, programs, and devices used within a company.

SUMMARY

An exemplary embodiment of the present disclosure relates to a computing system. The computing system includes a network interface configured to communicate data over a network, a vendor database configured to retrievable store vendor data related to a vendor of interest, and a processing circuit with a processor and memory. The memory is structured to store instructions that are executable by the processor and cause the processing circuit to identify a vendor of interest; conduct a search of internal documents and external resources to obtain the vendor data related to the vendor of interest, store the vendor data in the vendor database, and generate a vendor performance score based on the vendor data.

Another exemplary embodiment relates to a method. The method includes receiving, by a computing system, vendor information related to a vendor. The method also includes identifying, by the computing system, the vendor, and searching, by the computing system, internal documents for internal data corresponding to the vendor. The method also includes searching, by the computing system external resources for external data corresponding to the vendor and saving the internal data and the external data in a vendor database. The method further includes analyzing, by the computing system, the internal data and the external data in the vendor database to generate a vendor performance score and generating, by the computing system, a user interface configured to display the vendor performance score.

A further exemplary embodiment relates to an apparatus. The apparatus comprises a network interface and a processing system that includes a processor and memory. The memory is structured to store instructions that are executable by the processor and cause the processing circuit to store a list of one or more vendors, monitor new documents to detect a relevant document that mentions a vendor from the list of one or more vendors, store the relevant document, identify a user linked to the relevant document, determine a vendor performance score for the vendor, and provide the user with the vendor performance score.

These and other features, together with the organization and manner of operation thereof, will become apparent from the following detailed description when taken in conjunction with the accompanying drawings.

DETAILED DESCRIPTION

Referring to the Figures generally, various systems, methods, and apparatuses for facilitating data-supported, automated vetting of vendors are described herein. More particularly, systems and methods for locating, aggregating, and analyzing data related to a vendor to generate a scorecard of and/or provide insights to vendor performance are described herein.

In a company with multiple departments (e.g., Departments A-Z), some or all departments will seek vendors from outside the company to provide products and services to the department and the company. For example, an employee working in Department A might identify a prospective vendor who offers to supply a widget. Although other departments in the company might have had past experiences with the prospective vendor, and ongoing relationships might even exist between the company and the prospective vendor, the employee of Department A traditionally cannot successfully harness the full potential of vendor-related institutional knowledge due to a lack of communication or coordination across departments and due to the relevant data in the company's computing systems being scattered throughout multiple systems, applications, and formats. If the employee in Department A is unaware of or cannot locate full information about the vendor, Department A might, for example, enter a relationship with a vendor that Department B had a poor experience with, or pass over a vendor that historically served the company very well by providing great widgets to Department C. The systems and methods described herein beneficially facilitate the vetting of vendors by locating, aggregating, and analyzing data related to a vendor and sourced from data created throughout a company and from outside sources to generate a scorecard of vendor performance that provides an employee (for example, of Department A) with a full picture of a vendor's performance.

The embodiments described herein solve the technical and internet-centric problem of aggregating and deciphering large amounts of vendor information stored in various locations across a company's computing systems, along with potential external vendor information. Traditionally, difficulties in communication amongst business units across a company results in a lack of shared knowledge about the company's history with a particular vendor or prospective vendor. In such a situation, data relating to the company's relationship with a vendor is scattered throughout many different computing systems, devices, applications, file formats, and databases used by the company and its employees. For example, data relating to a vendor's performance may be found in email messages about the vendor, accounting records for vendor bills, meeting minutes from discussions with or about the vendor, performance data provided by internet-of-things devices serviced or provided by the vendor, and other sources. This diverse data often consumes substantial storage space in the company's computing systems, but can only be found and viewed through tedious searching and manual review by users running multiple applications on personal computing devices. Embodiments of the present disclosure increase the efficiency and accuracy of locating and analyzing the vendor-related data stored therein as compared to conventional systems. Additionally, embodiments of the present disclosure reduce the number of computations, inputs, outputs, downloads, and other computing steps required of user devices (e.g., personal computers, smartphones, tablets) to facilitate a user's access, comprehension, and distillation of vendor-related data.

According to example embodiments, as described in further detail below, facilitating the vetting of vendors with a vendor intelligence computer system may improve the ability for a company to leverage institutional knowledge and external resources—information often already accessible, generated, and/or stored as electronic data—to help evaluate a vendor. Unlike conventional vendor vetting and monitoring approaches, embodiments described herein use internal and external resources for data related to a vendor of interest, aggregate that data in a vendor database, and analyze that data to generate a vendor performance score, allowing for data from across multiple departments and from diverse data sources (i.e., different systems, document types, devices, etc.) within a company and sources outside a company to be efficiently and holistically considered. Notifications and user interfaces are provided to users to present a summary of vendor performance and inform the users that further information about a vendor of interest is available.

Embodiments of the present disclosure improve the functioning of a company computing system by locating, aggregating, and analyzing vendor-related data to provide a distilled, efficient, holistic view of previously scattered and unstructured data that may be automatically provided to users. Among other advantages, these embodiments can help users of the vendor intelligence computing system avoid repeated bad experiences with a vendor, duplicative research into a vendor, duplicative payments to a vendor, or ignorance of a particularly well-performing vendor.

Figure 1:
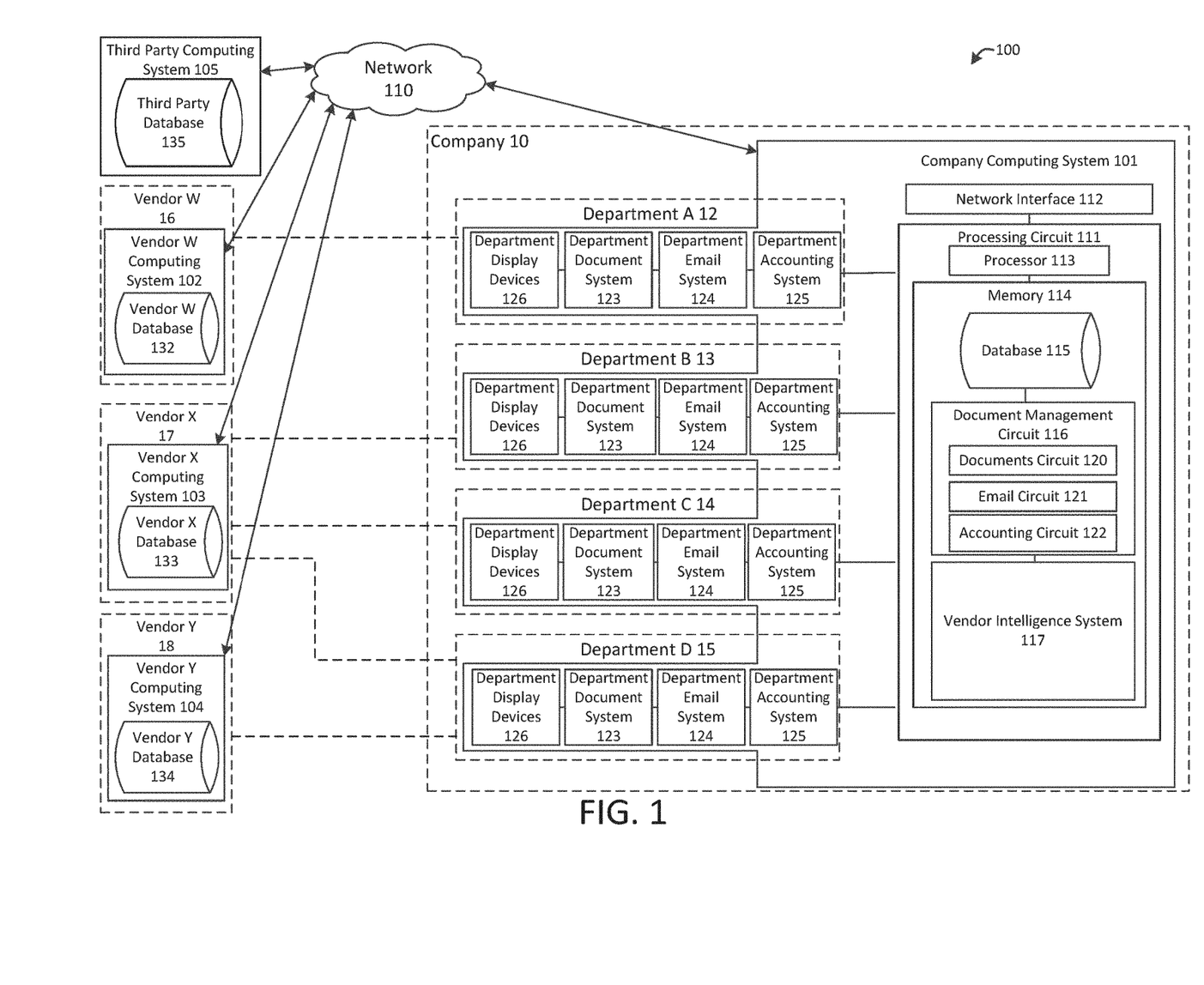
FIG. 1 is a schematic diagram of a company computing system with a vendor intelligence system, according to an example embodiment.

Referring now to FIG. 1, a schematic diagram of a vendor intelligence system is shown, according to an exemplary embodiment. Vendor intelligence system 100 includes a company computing system 101 for a company. The company is divided into multiple departments, shown as Department A, Department B, Department C, and Department D. The company may include any number of departments. Departments may be categorized by different lines of business, administrative functions (e.g., human resources, accounting), business functions (e.g., engineering, manufacturing, marketing), or any other categorization. The company may be a for-profit company, a charitable organization, a government entity, university, trade group, partnership, or any other organization or aggregation of organizations.

As shown in FIG. 1, and in various embodiments, the vendor intelligence system 100 is useful for a company with one or more departments engaged with one or more vendors. As discussed herein, vendors may include any outside entity that provides a service, product, or other valuable asset to the company. As shown, each department is engaged with at least one vendor outside the company. Specifically, FIG. 1 shows Department A engaged with Vendor W, Department B engaged with Vendor X, Department C engaged with Vendor X, and Department D engaged with both Vendor Y and Vendor X. The relationship between Department D and Vendor X may be independent of the relationships between Vendor X and Department B and Department C. Traditionally, the independence of the relationships creates potential problems for the company. For example, problems may arise related to potential duplicative payments to Vendor X, bad performance of Vendor X relative to Department B not being communicated to Department D, or other lost information that Department B and Department D fail to share related to Vendor X.

The company computing system 101 is configured to aggregate data about each vendor from throughout the company and from outside sources (e.g., Vendors W, X, Y), generate a vendor performance score, and generate and provide a notification or scorecard to a user that includes the vendor performance score and other vendor-related information. Company computing system 101 includes a network interface 112, and a processing circuit 111. Processing circuit 111 includes processor 113, and memory 114. The memory 114 is structured to store instructions that are executable by the processor 113 and cause the processing circuit 111 to identify a vendor of interest, conduct a search of internal documents and external resources to obtain vendor data related to the vendor of interest, store the vendor data in the vendor database, and generate a vendor performance score based on the vendor data.

The processor 113 may be implemented as a general-purpose processor, an application specific integrated circuit (ASIC), one or more field programmable gate arrays (FPGAs), a digital signal processor (DSP), a group of processing components that may be distributed over various geographic locations or housed in a single location, or other suitable electronic processing components. The one or more memory devices that comprise memory 114 (e.g., RAM, NVRAM, ROM, Flash Memory, hard disk storage, etc.) may store data and/or computer code for facilitating the various processes described herein. Moreover, the one or more memory devices that comprise memory 114 may be or include tangible, non-transient volatile memory or non-volatile memory. Accordingly, memory 114 may include database components, object code components, script components, or any other type of information structure for supporting the various activities and information structures described herein.

Network interface 112 is adapted for and configured to establish a communication via a network 110 with external computing systems, for example Vendor W computing system 132, Vendor X computing system 133, and Vendor Y computing system 134, and third party computing system 135. The network 110 provides communicable and operative coupling between the company computing system 101, the vendor computing systems 132-134, the third party computing system 135, and other components and sources described herein to provide and facilitate the exchange of communications (e.g., data, instructions, messages, values, commands). The network 110 may include any type or types of network, including wired (e.g., Ethernet) and/or wireless networks (e.g., 802.11X, ZigBee, Bluetooth, Internet, WiFi, etc.). Accordingly, the network interface 112 may include a cable modem, a broadband modem, a cellular modem, a Bluetooth transceiver, a Bluetooth beacon, a radio-frequency identification (RFID) transceiver, and/or a near-field communication (NFC) transmitter. In some arrangements, the network interface 112 includes the hardware and machine-readable media sufficient to support communication over multiple channels of data communication. Further, the network interface 112 may include cryptography capabilities to establish a secure or relatively secure communication session.

For each department in the company, the company computing system 101 includes a department document system 123, a department email system 124, a department accounting system 125, and department display devices 126. Although multiple department documents systems 123, department emails systems 124, and department accounting systems 125 may be used in the vendor intelligence system 100 (e.g., as shown in FIG. 1), for clarity of discussion only one of each will be described below.

The department document system 123 is configured to allow users to create, access, and store a variety of documents useful in the operation of the company. The department document system 123 is communicably coupled to memory 114, and may be communicable with network 110. In some embodiments, department document system 123 includes memory and processing systems on personal computers of employees working within a given department or electronic document management and storage systems operated within the company computing system 101. In alternative embodiments, department document systems 123 include electronic cloud storage operated by a third party and a catalog or library of physical documents.

The department email system 124 is configured to allow users and employees to draft, send, and receive electronic communications (e.g., email) from other users within the company and from outside the company, for example from an employee of Vendor W 16. The department email system 124 is communicable with network 110, and is communicably coupled to memory 114. The department email system 124 may be operated within company computing system 101 as shown or hosted by a third-party email service provider system communicably coupled to the company computing system 101 via network 110. In some embodiments, the department email system 124 is also configured to allow users to draft, send, and receive a broad range of electronic notifications, phone calls, or messages.

The department accounting system 125 is used by employees in the departments to record financial information related to that department, including information related to payments made to vendors or bills received from vendors. Department accounting system 125 is communicable with network 110 and communicably coupled to memory 114. As shown, department accounting system 125 is operated within company computing system 101. In some embodiments, department accounting system 125 is hosted by a third-party accounting solutions provider communicably coupled to the company computing system 101 via network 110.

The department display devices 126 include input/output devices configured to display user interfaces to and receive inputs from employees working in a given department. In some embodiments, department display devices 126 are communicably coupled to the memory 114 and to the department document system 123, the department email system 124, the department accounting system 125, and network 110 to allow employees to electronically access the features and functions of those elements described herein. Department display devices 126 include smartphones, mobile devices, computer monitors, laptop computers, televisions, projectors, and virtual reality devices. Department display devices 126 are configured to display data, graphics, and user interfaces created or stored in the vendor intelligence system 100.

The company computing system 101 further includes database 115, document management circuit 116, and vendor intelligence system 117. Database 115 is configured to retrievably store electronic documents and other data files created within or received by the company computing system 101. The database 115 allows access to the stored electronic documents and data for searching, copying, and altering purposes, as described further herein. Accordingly, the database 115 is communicably coupled to the document management circuit 116 and the vendor intelligence system 117. Database 115 is configured to allow document management circuit 116 to store files in database 115. The database 115 may be capable of storing documents in a variety of file types, including, but not limited to, .doc, .docx, .pdf, .csv, .png, .jpg, .mp3, .mp4, .stl, and .msg.

Document management circuit 116 includes documents circuit 120, email circuit 121, and accounting circuit 122. The document management circuit 116 is structured to manage and monitor multiple types of documents and data created within or received by the company computing system 101. Accordingly, the document management circuit 116 is communicably coupled to department document systems 123, department email systems 124, and department accounting systems 125. The document management circuit 116 may also be communicably coupled to vendor computing systems 102-104, third party computing system 105, or other external computing systems that provide data to the company computing system 101.

Documents circuit 120 is structured to aggregate document files from department document systems 123 for storage in database 115. The documents circuit 120 monitors documents created in department document systems 123, applies filters or searches to identify vendor-related documents, and copies documents for storage. Accordingly, documents circuit 120 is communicably coupled to department document systems 123 associated with each department and to database 115.

Email circuit 121 is configured to access, monitor, copy, and save emails sent by or to employees using department email systems 124. Accordingly, email circuit 121 is communicably coupled to department email systems 124 and database 115. In some embodiments, email circuit 121 passively filters, monitors, and/or copies emails sent using department email systems 124. In other embodiments, email circuit 121 is communicably coupled to an external email provider via network interface 112 to actively facilitate the transmission of email traffic between department email systems 124 and between internal and external email systems. The email circuit 121 is configured to store email files in database 115. In alternative embodiments, the email interface may ensure that emails are stored in external storage managed by a third party email exchange operator.

Accounting circuit 122 is configured to access, monitor, copy, and save accounting records stored, generated, or accessed by department accounting systems 125. Accordingly, accounting circuit 122 is communicably coupled to department accounting systems 125 and database 115. Accounting circuit 122 aggregates accounting information from department accounting systems 125 and stores the accounting information in database 115. In some arrangements, the accounting circuit 122 also monitors accounting information from department accounting systems 125 to identify vendor-related entries.

As discussed in detail below in reference to FIGS. 2-5, vendor intelligence system 117 is structured to aggregate data about vendors, analyze vendor data, and provide analytics and notifications about current and prospective vendors to employees of each department. Vendor intelligence system 117 is communicably coupled to document management circuit 116, database 115, and network interface 112, as well as vendor computing systems 102-104 and third party computing system 105. In alternative embodiments, the vendor intelligence system 117 is located in an external computing system, for example third party computing system 105, and offered as a service to the company.

Vendor computing systems 102-104 are operated by vendors, respectively, and may be operated to provide information about each vendor 16-18 to the company computing system 101. Vendor computing systems 102-104 are communicably coupled to the company computing system 101, for example via network interface 112. Vendor W computing system 102 contains vendor W database 132, vendor X computing system 103 contains vendor X database 133, and vendor Y computing system 104 contains vendor Y database 134. Vendor databases 132-134 are configured to store data related to the history of the relationship between the respective vendor and company, which, in some cases, includes performance data generated by devices and products provided by the vendor to the company. For example, a vendor provides, manages, and maintains printers, manufacturing equipment, building equipment, and/or other equipment configured to generate data about its own performance (e.g., usage statistics, downtimes, energy consumption, faults, errors). This equipment performance data is collected and stored in the vendor databases 132-134. In some arrangements, the vendor databases 132-134 also collect and store product delivery and tracking data, for example automatically generated by tracking devices and/or product tags (e.g., RFID tags and sensors, barcode scanners, GPS trackers), which may indicate late or missed deliveries. The vendor databases 132-134 are communicably coupled to the vendor intelligence system 117 via network interface 112 to allow the vendor intelligence system 117 to access the data stored in the vendor databases 132-134.

Third party computing system 105 is operated by a third party with relevant information about a vendor or vendors. For example, a third party may include a company review website provider such as Glassdoor, Yelp, TripAdvisor, etc. The third party computing system 105 is communicably coupled to the company computing system 101 and the vendor intelligence system 117, and includes third party database 135. The third party database 135 may store data related to a vendor or vendors of interest to the company, and may be accessed by the vendor intelligence system 117.

Figure 2:
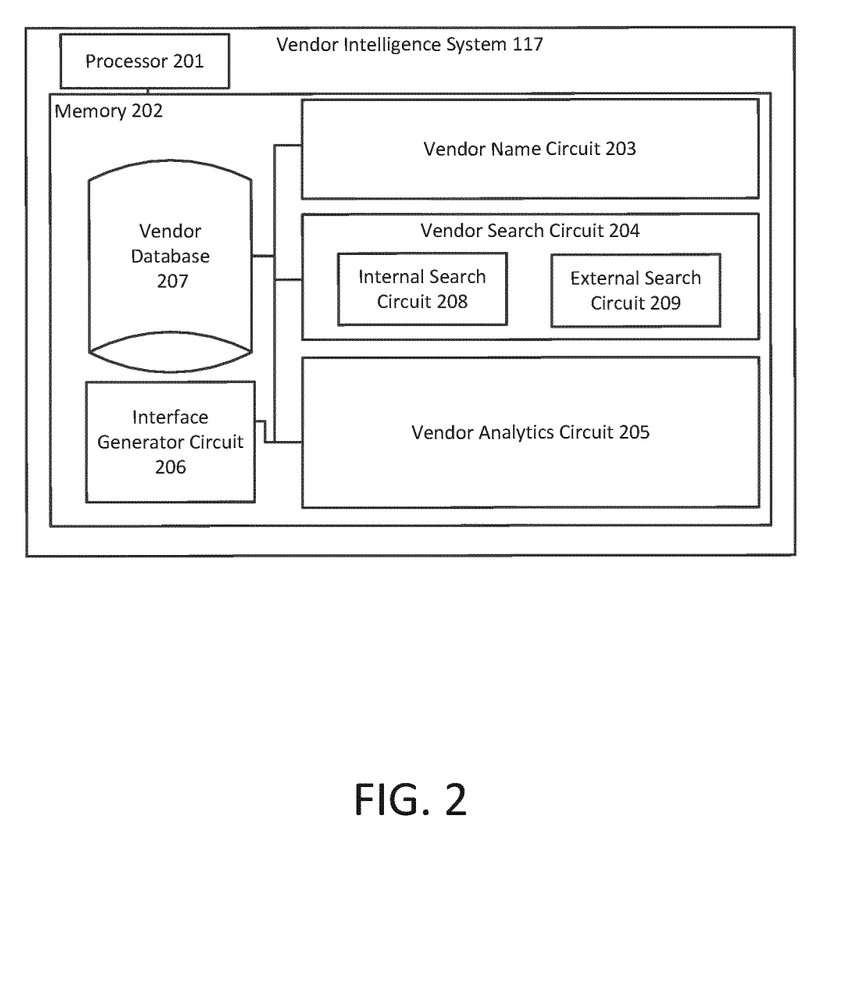
FIG. 2 is a detailed schematic drawing of the vendor intelligence system of FIG. 1, according to an example embodiment.

Referring now to FIG. 2, a detailed block diagram of the vendor intelligence system 117 is shown, according to an example embodiment. Vendor intelligence system 117 includes a processor 201 and a memory 202. The processor 201 may be implemented as a general-purpose processor, an application specific integrated circuit (ASIC), one or more field programmable gate arrays (FPGAs), a digital signal processor (DSP), a group of processing components that may be distributed over various geographic locations or housed in a single location, or other suitable electronic processing components. The memory 202 may include one or more memory devices (e.g., RAM, NVRAM, ROM, Flash Memory, hard disk storage, etc.) may store data and/or computer code for facilitating the various processes described herein. Moreover, the one or more memory devices of memory 202 may be or include tangible, non-transient volatile memory or non-volatile memory. Accordingly, memory 202 may include database components, object code components, script components, or any other type of information structure for supporting the various activities and information structures described herein.

According to the example embodiment shown in FIG. 2, the vendor intelligence system 117 includes a vendor name circuit 203, vendor search circuit 204, vendor analytics circuit 205, interface generator circuit 206, and vendor database 207.

Vendor name circuit 203 stores a list of past, current, or potential future vendors whose names appear in the vendor database 207, uses the list of vendor names to create a filter or filters, and deploys each filter in the document management circuit 116. Accordingly, vendor name circuit 203 is communicably coupled to the document management circuit 116, including the documents circuit 120, the email circuit 121, and the accounting circuit 122. The vendor name circuit 203 may monitor the documents circuit 120, the email circuit 121, and the accounting circuit 122 to flag documents, messages, or accounting entries related to a name on the list of vendor names. The vendor name circuit 203 may also include a natural language processing filter that may be deployed in the documents circuit 120. The natural language processing filter may use known natural language processing and machine learning techniques to identify emails and documents which allude to an existing vendor without using the vendor name explicitly or which appear to make reference to the vetting or contracting of an as-yet-unknown vendor. The vendor name circuit 203 can thereby identify all emails, documents, accounting files, and other internal information created by the company's departments which relate to a vendor. In some embodiments, vendor name circuit 203, in coordination with interface generator circuit 206, also provides employees with a user interface to enter names of vendors of interest. When the vendor name circuit 203 detects activity related to a vendor name through one of these or another means, the vendor name circuit 203 may send a request for a search to the vendor search circuit 204.

The vendor search circuit 204 is configured to generate search criteria, run a search of internal and external sources, and copy or download search results for storage in the vendor database 207. The vendor search circuit 204 thus includes an internal search circuit 208 and an external search circuit 209. The vendor search circuit 204 is communicably coupled to the vendor name circuit 203, the vendor database 207, the database 115, the document management circuit 116, as well as the third party computing system 105, the vendor computing systems 102-104, and other external sources accessible via network interface 112.

Internal search circuit 208 is configured to generate search criteria and access, copy, rearrange, or otherwise alter files located in the database 115 and the vendor database 207. Internal search circuit 208 may receive a search request from the vendor name circuit 203 that identifies a vendor of interest. Internal search circuit 208 may then formulate search criteria to be used in conducting a search for internal information related to the vendor of interest. Search criteria may include text search terms, Boolean logic, natural language processing criteria, time-range restrictions, file type restrictions, or other relevant factors including now know or later developed artificial intelligence agents configured to sort unstructured data. Search criteria may be automatically tailored based on known false hits or near misses. For example, the internal search circuit 208 may use artificial intelligence or machine learning techniques to identify frequent misspellings of a vendor name and include the misspellings in the search terms. Internal search circuit 208 may also tailor the search criteria base on a stored search history, to avoid redundant searches and efficiently use processor resources.

Internal search circuit 208 then accesses the files stored in database 115 and applies the search criteria to the files stored therein. Internal search circuit 208 may search a variety of files in the database 115, including emails, calendar data, travel arrangements, meeting minutes, contracts, pitch presentations, accounting records, invoices, bills, letters, phone call histories, vendor evaluation forms, and equipment performance data, among other categories. Certain sub-sections of the database 115 may be prioritized based on past success of finding relevant vendor information in those sub-sections. In some embodiments, all files in the database 115 may be accessed by the internal search circuit 208, while in other embodiments access to some files may be restricted for security, confidentiality, trade secret, or other reasons.

When the internal search circuit 208 identifies files based on the search criteria, it copies those files and stores them in the vendor database 207. Files in the vendor database 207 may be organized in folders by vendor name created by the vendor name circuit 203 or the vendor search circuit 204. In this way, the internal search circuit 208 aggregates copies of all internal documents related to the vendor of interest in the vendor database 207.

External search circuit 209 may also receive a search request from the vendor name circuit 203 that identifies a vendor of interest. External search circuit 209 is structured to formulate external search criteria, run a search based on those criteria, and download data resulting from the search. External search circuit 209 is communicably coupled to the third party computing system 105, the vendor computing systems 102-104, and other external sources accessible via network interface 112.

External search circuit 209 formulates search criteria to be used in conducting a search for external information related to the vendor of interest. Search criteria may include text search terms, Boolean logic, natural language processing criteria, time-range restrictions, file type restrictions, or other relevant factors. External search criteria may identify target websites, third-party databases or search engines, and other external sources to be search, and may be targeted towards revealing information like customer reviews and company finances. Websites and third-party databases include crowd-sourced review platforms (e.g., Yelp, TripAdvisor, Glassdoor), expert review blogs, industry news sites, business data aggregators (e.g., Bloomberg, Hoovers), social media (e.g., Facebook, Twitter, LinkedIn), and other sources of relevant information. External search criteria may also be automatically tailored based on known false hits or near misses. For example, the external search circuit 209 may use artificial intelligence or machine learning techniques to identify frequent misspellings of a vendor name and include the misspellings in the search terms. External search circuit 209 may also identify vendor company pseudonyms, parent companies, or subsidiaries and add those entities to the search criteria. External search circuit 209 may also tailor the search criteria base on a stored search history, to avoid redundant searches and efficiently use processor and network resources. In some cases, external search circuit 209 identifies sources of vendor device performance data or delivery tracking data, for example generated by self-monitoring devices (e.g., connected printers, smart manufacturing equipment) and tracking systems, and targets those sources as part of the search criteria.

External search circuit 209 then accesses external websites, databases, and other third party sources via network interface 112, including the third party database 135 of the third party computing system 105 and the vendor databases 132-134 of the vendor computing systems 102-104. Search of these sources may include text-based searching and Boolean logic, but may require advanced data processing, natural language processing, and artificial intelligence engines to sift through unstructured or diversely-structured data sources. External searching may be simplified by limiting the search to known webpages or databases with known data structures or trustworthy information, or may be left to explore wider source material accessible via the internet using advanced algorithms. When the external search circuit 209 identifies relevant source material, the external circuit can download that material to be saved in the vendor database 207 via the network interface 112. This external material may be stored in the same folder in the vendor database 207 as the internal search results, so as to create a unified repository of internal and external files related to a vendor stored in the vendor database 207.

Vendor analytics circuit 205 is configured to access the collection of vendor-related files in the vendor database 207 to generate vendor-related metrics and distilled information to be provided to users. Accordingly, the vendor analytics circuit 205 is communicably coupled to the vendor database 207 and the interface generator circuit 206. In one example, vendor analytics circuit 205 uses natural language processing, machine learning, neural networks, genetic algorithms, Bayesian networks, Hidden Markov models, Kalman filters, and other now known or later developed artificial intelligence approaches to parse and analyze the diverse file types, data types, and informational content in the vendor database 207.

In another example, the vendor analytics circuit 205 also utilizes file content, such as email text, as well as metadata such as email send time, author, recipient, and message chain links to derive vendor performance indicators. For instance, the vendor analytics circuit 205 determines whether the company had prior engagements with the vendor of interest and organize data surrounding prior engagements. The determination can include detecting the extent of the vendor engagement, ranging, for example, from whether a preliminary investigation into the vendor was all that occurred, or whether a contract was signed and a years-long relationship continues. In some embodiments, vendor analytics circuit 205 accesses calendar invites and events and associates them with meeting minutes, travel arrangements, and related email traffic to derive vendor performance indicators. Vendor analytics circuit 205 may use sentiment analysis to detect whether the creator of an email or other document was satisfied or dissatisfied with the vendor's performance. Sentiment analysis may include detection of nuanced emotional reactions including, for example, anger, happiness, indifference, gratitude, frustration, and apathy. Sentiment analysis and other data analysis may also be applied to phone calls between company employees and vendor representatives to determine the availability of vendor representatives (e.g., amount of time spend on hold), the attitude and helpfulness of the vendor representatives, and the impressions of the company employees towards the vendor representatives. In some arrangements, the vendor analytics circuit 205 weighs sources based on a reliability evaluation, resulting, for example, in the opinions of internal managers carrying more weight than anonymized input to crowdsourced reviews websites. In some cases, the vendor analytics circuit 205 uses equipment performance data generated by a vendor's connected/smart equipment (e.g., downtimes of printers, emergency stop or failure frequencies of manufacturing equipment, energy consumption of building equipment) and delivery tracking equipment (e.g., product tracking data compared to orders, invoices, or other documents) to derive metrics or performance indicators for the vendor.

Vendor analytics circuit 205 generates a single numerical performance score summarizing vendor quality and reliability. For example, the numerical performance score is on a continuum (e.g., from 0 to 10), such that multiple vendors can be compared. A low score indicates that a vendor should be avoided, while a high score indicates that a vendor is a good choice for future relationships. The vendor analytics circuit 205 may use this score to make a recommendation about whether or not a vendor should be considered for a future contract or contract extension. In alternative embodiments, the vendor analytics circuit 205 provides a plurality of performance indicators relating to different aspects of a vendor. In some embodiments, vendor analytics circuit 205 also generates a semantic summary of the vendor's identity, the reasons behind the vendor's numerical performance score, and the company's history with the vendor. Vendor analytics circuit 205 may also identify interesting quotes and statistics from sources in the vendor database 207, identify individual employees in frequent contact with the vendor of interest, identify the department or departments having a history with the vendor of interest, and identify the goods or services provided to the company by the vendor. Vendor analytics circuit 205 then communicate these outputs to the interface generator circuit 206 and stores them in the vendor database 207.

The interface generator circuit 206 is configured to receive vendor-related information from the vendor analytics circuit 205 and generate an interface to provide to a user to communicate the vendor-related information to the user. Accordingly, the interface generator circuit 206 is communicably coupled to the vendor analytics circuit 205 and one or more user devices, for example via department email systems 124. Interface generator circuit 206 receives a vendor name, a numerical performance score, a semantic summary, quotes, statistics, employee contact names, department relationship histories, or other information from the vendor analytics circuit 205. Interface generator circuit 206 can arrange this data on a dashboard, to present all of the resulting data in a single view or in an easy-to-navigate display. Interface generator circuit 206 can configure the dashboard to be presented in a digital format on a desktop computer, laptop computer, smartphone, tablet, or other electronic device. An embodiment of this dashboard will be discussed below with reference to FIG. 5. According to various embodiments, interface generator circuit 206 color-codes the numerical performance score and/or places it along a number line, to graphically indicate the vendor quality relative to the range of possible ratings. The interface generator circuit 206 can also generate links to further information about a vendor, to source material for the analytics, to a contact person's contact information, or to a second interface configured to accept reviews about the vendor.

In some embodiments, the vendor intelligence circuit 117 is configured, in response to a particularly problematic result from the vendor analysis, to automatically control equipment or carry out other functions to respond to the result. For example, if analysis suggests that the manufacturing equipment provided to the company by the vendor is dangerous for operators and/or is resulting in defective products, the vendor intelligence circuit 117 can automatically shut down, lock, or otherwise prevent the operation of the manufacturing equipment. The vendor intelligence circuit 117 may also control equipment to run diagnostic tests, run software updates, or otherwise alter the function of the equipment. As another example, in response to a determination that a vendor's deliveries of a widget are likely to be late or deficient, the vendor intelligence circuit 117 may automatically order additional or replacement widgets from another vendor. In some embodiments, the vendor intelligence circuit 117 is configured to generate control signals to deploy additional resources to respond to a determination that a vendor is not able to satisfy the vendor's responsibilities to the company (e.g., by automatically contacting a back-up vendor) or to warn customers that may be affected by the vendor's poor performance (e.g., by sending an email to the customers, by listing a product as back-ordered in a webstore or inventory management system, by adjusting the price of a good or service).

Figure 3A:
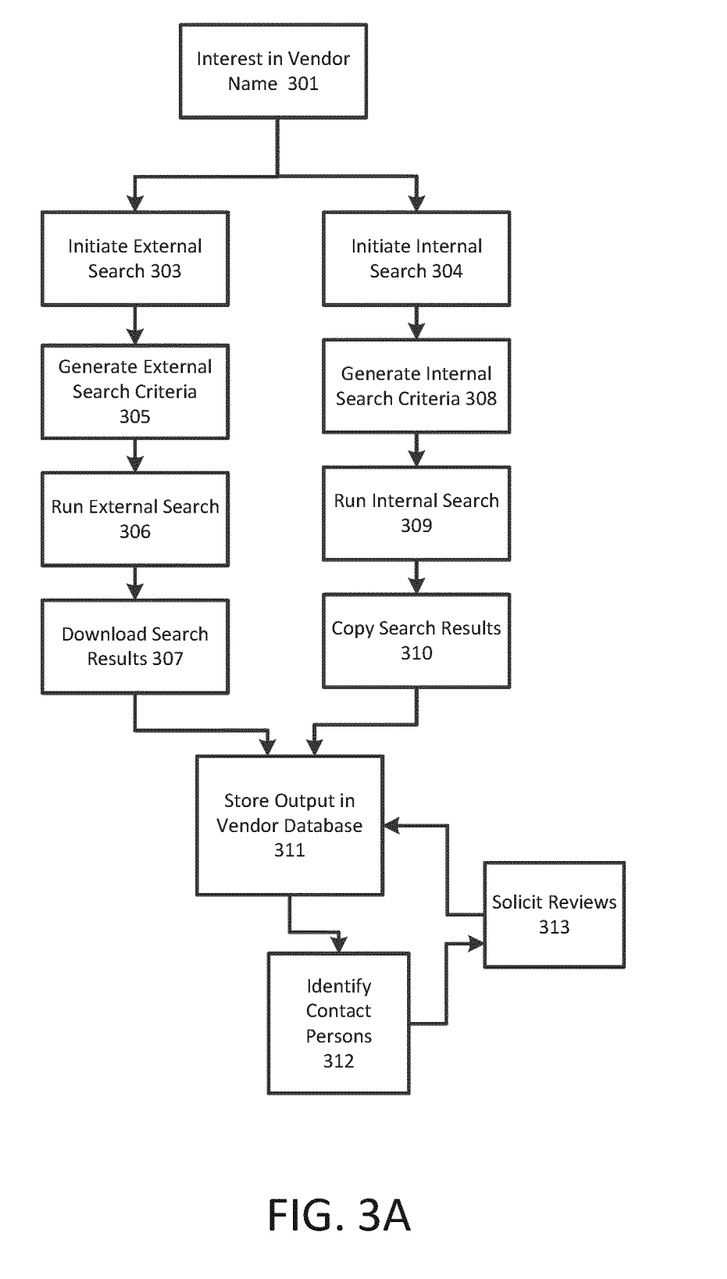
FIG. 3A is an illustration of a first part of a process of developing a vendor scorecard, according to an example embodiment.
Figure 3B:
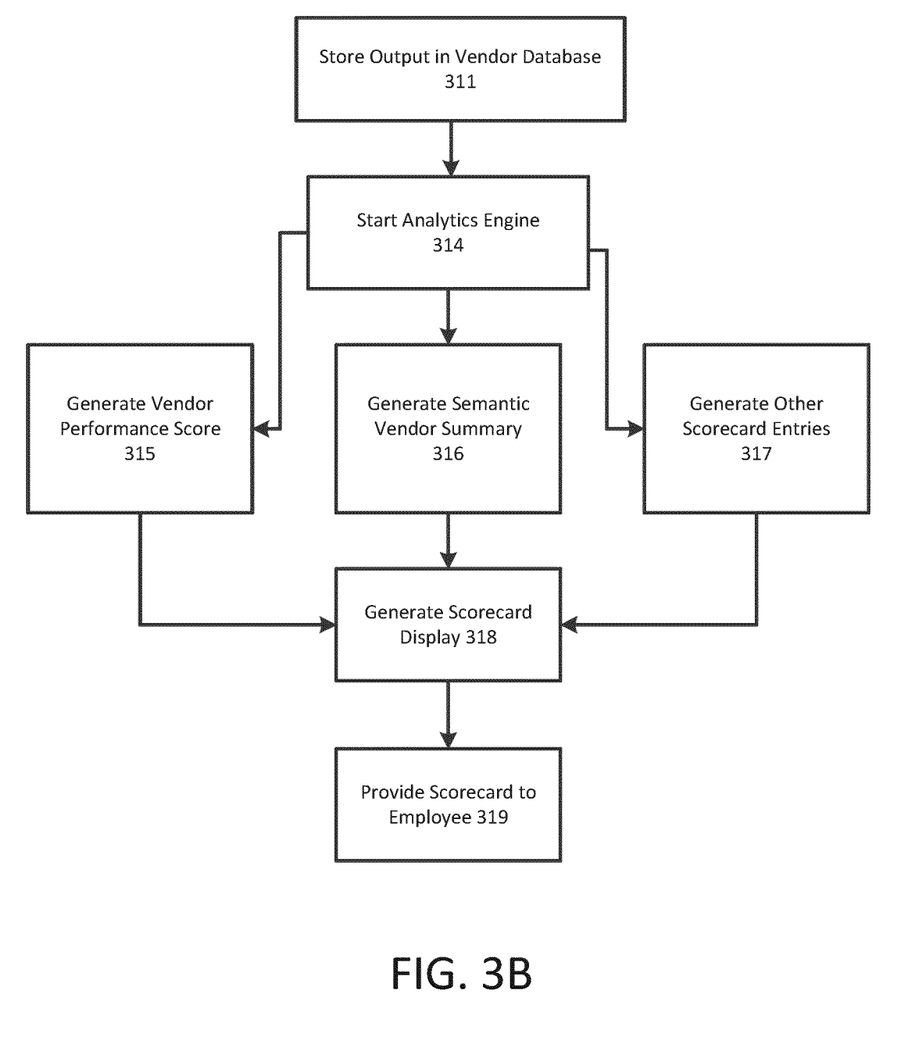
FIG. 3B is an illustration of a second part of the process of developing a vendor scorecard illustrated in FIG. 3B, according to an example embodiment.

Referring now to FIGS. 3A and 3B, an example process of developing a vendor analysis scorecard is shown, according to an example embodiment. The process depicted in FIGS. 3A and 3B can be carried out using the company computing system 101 of FIG. 1. Interest in a vendor is indicated by an employee in the company at step 301. In some arrangements, interest is indicated explicitly through a request for information about a vendor, or is detected passively through monitoring of emails and other documentation for an indication. If the vendor has not been evaluated previously, the vendor database 207 is prepared to receive and store information related to that vendor, for example by creating a new organizational structure corresponding to the new vendor in the vendor database 207.

Indication of interest in a vendor triggers an external search at step 303 and initiates an internal search at step 304. The external search includes searching third-party websites, data bases, and other information sources via the internet such as crowd-sourced review platforms (e.g., Yelp, TripAdvisor, Glassdoor), expert review blogs, industry news sites, business data aggregators (e.g., Bloomberg, Hoovers), and social media (e.g., Facebook, Twitter, LinkedIn). The external search may include searching directly within the third party database 135, as a third party such as Glassdoor may provide the company with direct access to third party computing system 105 separate from the publically-available browser-friendly webpage. In some arrangements, vendors also provide direct access to vendor information stored in vendor databases 132-134. The internal search includes searching stored internal documents including emails, calendar data, travel arrangements, meeting minutes, contracts, pitch presentations, accounting records, invoices, bills, letters, phone call histories, vendor evaluation forms, employee or vendor work product, among other categories.

To carry out the searches, external search criteria are formulated at step 305 and an external search is run using the criteria at step 306, for example by the external search circuit 209 of vendor search circuit 204. External search criteria include keyword terms, Boolean logic, natural language processing techniques, and other artificial intelligence approaches, and can indicate the websites or databases to be searched. In some arrangements, running the external search includes a variety of artificial intelligence approaches to locate and parse relevant information from diverse, unstructured, third-party sources. At step 307, data resulting from the external search are downloaded by the external search circuit 209 to vendor database 207. Meanwhile, internal search criteria are formulated at step 308, an internal search is run at step 309, and, at step 310, the internal files corresponding to search results are copied by the internal search circuit 208 of the vendor search circuit 204. Internal search criteria include keyword terms, Boolean logic, natural language processing techniques, and other artificial intelligence approaches, and the categories and file types of internal documents to be searched. In some arrangements, running the external search includes a variety of artificial intelligence approaches to locate and parse relevant information from diverse, unstructured internal sources. In some embodiments, some internal files are hidden from the internal search for data security and data privacy purposes and to comply with data privacy and data protection laws and regulations.

At step 311, the downloaded external documents and data and the collected internal documents and data are aggregated and saved in the vendor database 207. As mentioned above, the vendor database 207 is structured to store a wide variety of file types and is organized by vendor so that all data relating to a vendor is accessible together. To improve the dataset, at step 312 the vendor analytics circuit 205 analyzes the data stored in the vendor database 207 to identify employees who may be able to offer a direct review of the vendor. The vendor analytics circuit 205 communicates with the interface generator circuit 206 to prompt such reviews by sending a notification or interface to a user device at step 313. The interface generator may provide a user interface that allows a user to input structured and unstructured reviews (e.g., numerical ratings, Likert scale inputs, free-text entries) that are then saved with other vendor-related data in the vendor database 207.

At step 314, the vendor analytics circuit 205 analyzes the data that was stored in the vendor database 207 in step 311 (shown in both FIGS. 3A and 3B). The vendor analytics circuit 205 uses natural language processing, machine learning, neural networks, genetic algorithms, Bayesian networks, Hidden Markov models, Kalman filters, and other now know or later developed artificial intelligence approaches to parse and analyze the diverse file types, data types, and informational content saved in the vendor folder. The vendor analytics circuit 205 continues to update its analyses as reviews are added to the vendor data (step 312). At step 315, the vendor analytics circuit 205 creates a vendor performance score that indicates a numerical score on a continuous scale indicating the quality, reliability, or desirability of the vendor's performance. At step 316, the vendor analytics circuit 205 generates a semantic summary of the vendor's profile that provides a summary of the vendor's profile in natural language (e.g., English sentences). At step 317, the vendor analytics circuit 205 identifies other interesting information, for example data points about vendor pricing, orders, or performance.

At step 318, a vendor scorecard is then generated by the interface generator circuit 206 to display these outputs. The interface generator circuit 206 may formulate the vendor scorecard to provide a holistic view of the vendor in a single view or display only the most important information about a vendor. The interface generator circuit 206 may format the vendor scorecard for presentation on a variety of electronic device with various screen shapes and sizes, particularly department display devices 126. Lastly, at step 319, the vendor scorecard is provided to a user on a graphical user interface. The vendor intelligence system 117 is communicably coupled to a department display devices 126 to transmit the scorecard generated by the interface generator circuit 206 to the department display devices 126. In some embodiments, the graphical user interface is presented on a smartphone, tablet, laptop computer, a desktop computer, or any other digital medium. In other embodiments, the vendor scorecard is automatically printed on paper and delivered to an employee.

The process shown in FIGS. 3A-B may periodically return to the search stage (i.e., steps 303 and 304) to update the scorecard. The method of the example embodiment shown in FIGS. 3A-B thereby allows repeated monitoring and updating of vendor scorecards.

Figure 4:
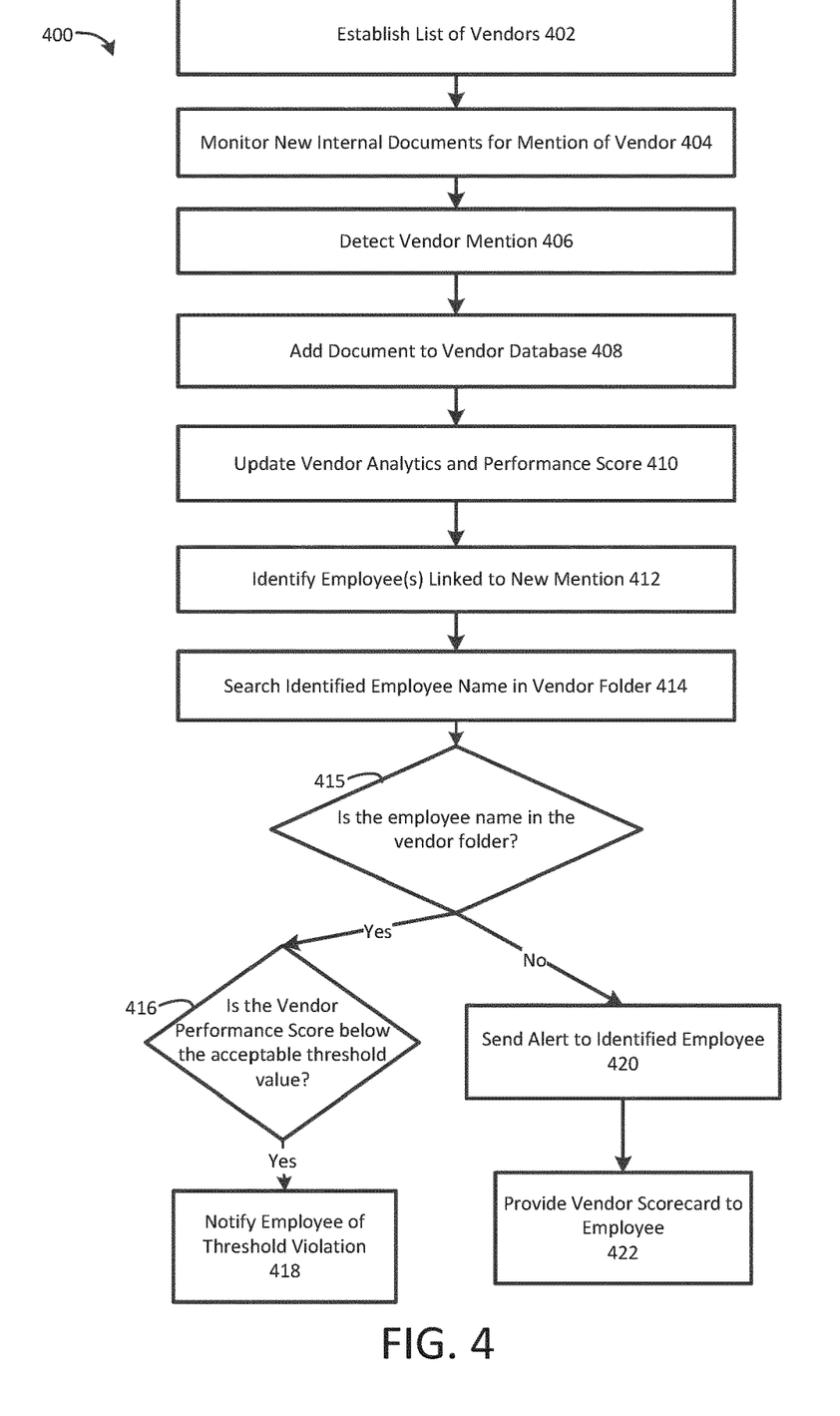
FIG. 4 is a flow diagram of a method for notifying employees of a vendor scorecard, according to an example embodiment.

Referring now to FIG. 4, a flowchart depicting a process 400 of notifying employees about vendor analytics is shown. The process 400 can be carried out by the vendor intelligence system 117 in communication with other elements of company computing system 101. To start, a list of vendors is established by the vendor name circuit 203 at step 402. This list includes vendors currently engaged with the company, and can include other vendors for whom relevant information is already stored in the vendor information database or other company computer component. The list of vendors includes vendors for whom vendor analytics have already been developed as described above in reference to FIG. 3A-B. Based on the list of vendors, new internal documents are monitored for mentions of the vendor at step 404. The vendor name circuit 203 generates a filter that identifies named vendors, and communicates with the document management circuit 116 to apply the filter to new documents. Monitored documents include emails, recordings or transcripts of phone calls, phone logs, employee or vendor work product, contracts, invoices, bills, accounting information, among other categories. Monitoring include filtering emails that include the text of a vendor name or nickname, or are sent to or by an email domain linked to the vendor. In some arrangements, monitoring also involves artificial intelligence and natural language processing techniques to determine that a vendor is involved in the subject matter of the document or is otherwise related to the document.

In step 406, a new mention of a vendor is detected by the vendor name circuit 203 and/or the document management circuit 116. At step 408, the document or file containing the new mention is copied and saved alongside any previously-stored information related to that vendor in the vendor database 207. In some cases, the vendor database 207 already contains documents related to the vendor, for example aggregated as described above in reference to FIG. 3. At step 410, existing vendor analytics are then updated by the vendor analytics circuit 205 to take into consideration the new mention, including updating the vendor performance score. In some cases, updating the vendor analytics also includes updating an external search for new vendor information available on websites and in third-party databases using external search circuit 209, and running an internal search of the database 115 using internal search circuit 208, as described above with reference to FIG. 3.

Process 400 further involves identifying an employee or employees associated with the detected new mention of a vendor at step 412, for example by analyzing the data stored in the vendor database 207 with the vendor analytics circuit 205. At step 414, a search of the vendor database 207 is run by the vendor analytics circuit 205 or the vendor name circuit 203 for that identified employee's name in the vendor folder. A list of employee names related to a vendor can be stored in the vendor database 207, or the search can look through all stored documents for the employee's name. In some arrangements, this step 414 is restricted to only those employees with the authority to make vendor-related decisions such as managers and directors.

If the employee's name is found in the vendor folder in decision 415, indicating that the employee has a history of engagement with the vendor, the vendor's updated performance score is checked against an acceptable threshold value by the vendor analytics circuit 205 in decision 416. In various embodiments, this threshold value is set by a centralized company administrator, by a department, by an individual employee, or automatically by the vendor intelligence system 117. The threshold value is a floor to an acceptable range of vendor performance scores, such that a vendor performance score below the threshold value indicates that the vendor's performance is not acceptable. If the score is below the acceptable threshold, a notification is sent to the employee informing the employee that the vendor's updated score is below the acceptable threshold at step 418. The notification is generated by the interface generator circuit 206 in response to instructions from the vendor analytics circuit 205, and is sent to one or more department display devices 126 for presentation to the employee. In some arrangements, the notification is delivered via email through the department email systems 124. If the score is above the acceptable threshold, the process 400 ends. The vendor intelligence system 117 thus informs an employee when a previously-better-performing vendor slips below an acceptable performance level. This monitoring of established vendors and employee notification may be advantageous in expediting vendor review, vendor discipline, renegotiation of vendor contracts, or initiating other vendor-related changes. While the frequency of vendor analytics updates as shown in FIG. 4 is determined by new mentions of the vendor in the company computer system, in other embodiments the frequency of vendor analytics updates may be determined by a set time interval or may be tied to other triggering events including direct requests for updated analytics and exceptional equipment performance data.

In some embodiments, the vendor intelligence system 117 controls vendor-provided equipment (e.g., printers, manufacturing equipment, building equipment, electronic devices) to mitigate problems captured by the low performance score (e.g., by shutting down dangerous equipment, initiating updates/diagnostics/maintenance of equipment). In some embodiments, the vendor intelligence system 117 also automatically mitigates the effects of poor vendor performance in other ways, for example by placing an order with a back-up vendor or engaging another vendor to perform a service that the original vendor is struggling to perform to deploy additional resources to address an issue, adjusting an inventory management system to show a product as back-ordered, defective, or otherwise flawed in connection with the vendor's poor performance, or performing some other mitigation. The vendor intelligence system 117 may base the scope of the automated mitigation action on a determination of the criticality of the vendor to the company. If the vendor's function is critical to the company's continued ability to operate (e.g., a key supplier), the vendor intelligence system 117 takes more substantial steps in response to a poor vendor score than if the vendor's function is more standard or secondary to main business concerns (e.g., office cleaning services).

If the employee's name is not found in the vendor folder in decision 415, an alert is sent to the identified employee at step 420. The alert is generated by the interface generator circuit 206 and is transmitted to the employee via department display devices 126. In some arrangements, the alert is sent via email using department email systems 124. This alert informs the employee that the company has a history with the mentioned vendor, and includes providing the updated vendor scorecard to the employee at step 422. The updated vendor scorecard is generated by the interface generator circuit 206 using vendor analytics (e.g., a vendor performance score, semantic summary, other relevant data) provided by the vendor analytics circuit 205. In this way, an employee that mentions a vendor for the first time is automatically provided with an overview that includes a vendor performance score, a semantic summary of the vendor's identity and history with the company, contact information for company departments and employees that have experience with the vendor, and other relevant vendor information. Advantageously, this ensures that an employee will be made aware of the company's institutional knowledge and experience with a vendor, helping to minimize duplicate evaluation work or duplicate payments to a vendor, prevent new engagements with poor-performing vendors, and encourage new engagements with well-performing vendors.

Figure 5:
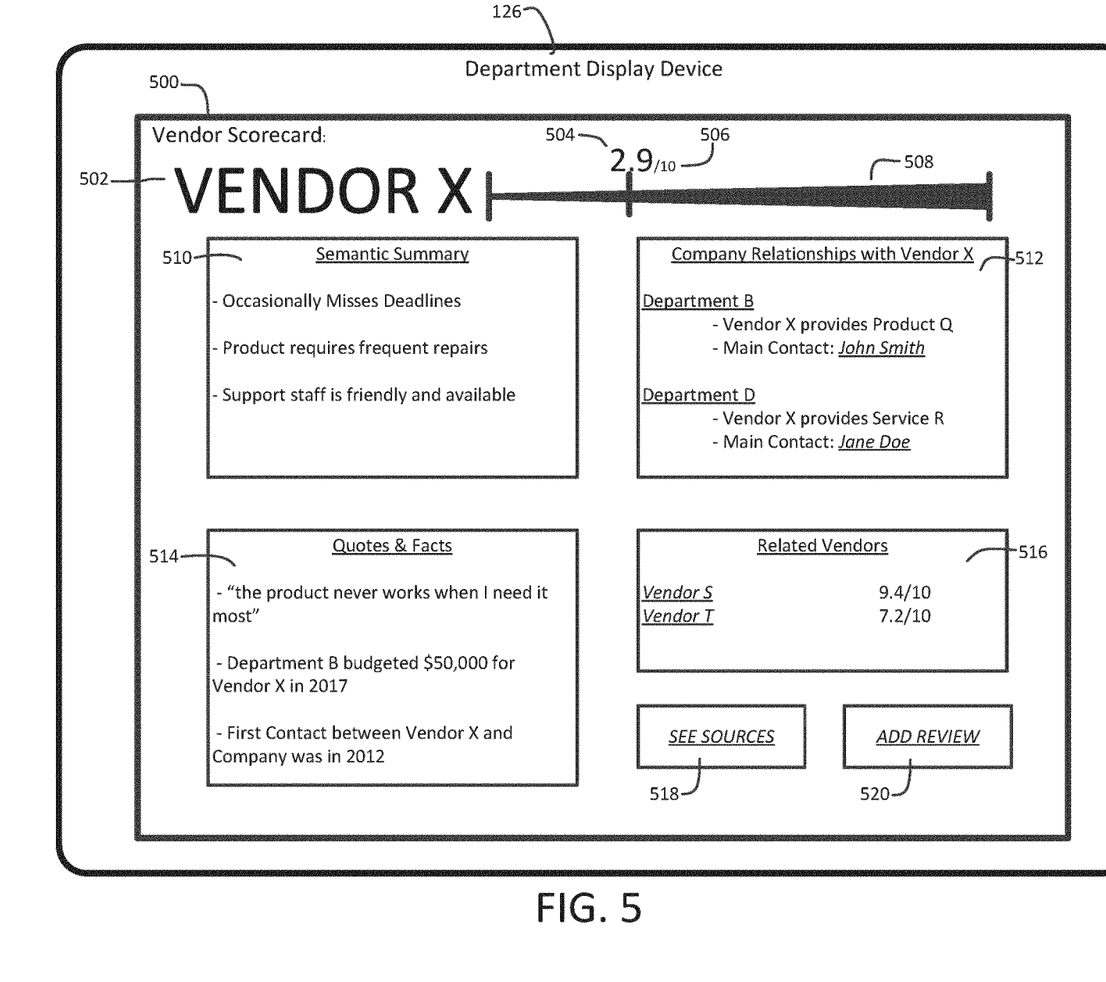
FIG. 5 is a diagram of a vendor scorecard generated by the vendor intelligence system of FIG. 1, according to an example embodiment.

Referring now to FIG. 5, an example user interface of a vendor scorecard 500 is shown. The vendor scorecard 500 is generated by the interface generator circuit 206 based on information provided by the vendor analytics circuit 205. The vendor scorecard is formatted or configured for display on the department display devices 126. The vendor intelligence system 117 are communicably coupled to the department display devices 126 to transmit the vendor scorecard 500 to the department display devices 126.

Vendor scorecard 500 includes vendor name 502 and vendor performance score indicator 504. Vendor performance score indicator 504 presents the vendor performance score, which represents an aggregate evaluation of vendor reliability and quality and can be generated as described above in reference to FIGS. 2-4. On vendor scorecard 500, the vendor performance score indicator 504 indicates how the vendor's performance score compares to the best possible and worst possible performance scores. A maximum score indication 506 is displayed adjacent to the vendor performance score indicator 504. The vendor performance score indicator 504 is also positioned according to the value of the vendor's performance score on a rating continuum 508 that ranges from the worst possible performance score to the best possible performance score. In some embodiments, the vendor performance score indicator 504 and/or the rating continuum 508 are colored to indicate a good score (e.g., green, blue), a neutral score (e.g., yellow), or a bad or warning score (e.g., red, orange). The vendor performance score indicator 504 is thereby indicated as part a continuous spectrum of possible scores. As shown, the vendor performance score indicator 504 indicates a vendor performance score that ranges from zero to ten. In other embodiments, the possible vendor performance scores are scaled to any suitable numerical range (e.g., 0 to 100, −5 to 5). In some embodiments, the vendor performance score is correlated to and presented as discrete grade letters (e.g., A, B, C, D, F), a dichotomous judgment (e.g., good/bad, acceptable/unacceptable) or other non-continuous scale.

Vendor scorecard 500 also includes semantic summary widget 510. Semantic summary widget 510 presents summary statements generated by the vendor intelligence system which aggregate relevant information about the vendor into short statements presented in natural language. Summary statements presented in semantic summary widget 510 include warnings about main vendor issues, praise of particular vendor products or services, advice for dealing with the vendor, or other remarkable information about the vendor. For example, a summary statement may state that a product provided by the vendor requires frequent repairs, which may be based on equipment performance data generated by the product itself that captures its downtime, failure frequency, or other data relating to error events.

Vendor scorecard 500 also includes relationships widget 512. Relationships widget 512 shows which departments and individuals within the company have a current or past relationship with the vendor. Relationships widget 512 lists the departments that have a history with the vendor, and gives a short summary of the nature of that relationship, such as identifying the product or process supplied by the vendor to that department. Relationships widget 512 can also provide a main contact name that indicates an individual employee to contact for first-hand information about the vendor. The contact name is a hyperlink that leads to contact information for the listed employee, launches a new email or chat window addressed to that employee, or provides some other means of contacting the listed employee.

Vendor scorecard 500 also include quotes and facts widget 514. Quotes and facts widget 514 displays interesting quotes or facts pulled from documents related to the vendor. Entries in quotes and facts widget 514, for example, includes quoted complaints or praise for a vendor product or service, financial data from a budget, bill, or invoice related to the vendor, historical information about the length or extent of the company's history with the vendor, or operation metrics derived from equipment performance data generated by vendor-provided equipment (e.g., equipment downtime rates, failure rates, capacities).

Vendor scorecard 500 also includes related vendors widget 516. The related vendors widget 516 lists other vendors that provide similar products or services as provided by the vendor of interest. The related vendors widget 516 includes a vendor performance score for each of the listed related vendors. The related vendors widget 516 also includes hyperlinks to the scorecard for the related vendors or other options for learning more about the related vendors. The related vendors widget 516 thereby provides a way to quickly compare the vendor of interest to other potential vendors. In some cases, the related vendors widget includes an indication of the cost of switching to the related vendor or using the related vendor to deploy additional resources to support a poor-performing existing vendor. These relative costs may also be incorporated into the vendor performance score, for example lowering the score if the cost to mitigate the vendor's poor performance is high.

Vendor scorecard 500 also includes sources button 518. Sources button 518 can be selected to navigate to a visualization of the documents and other information used to generate the vendor scorecard 500. Vendor scorecard 500 also included add review button 520. Add review button 520 can be selected to navigate to an interface which allows a user to directly input a review of the vendor.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include general purpose computing in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computing system comprising:
   a network interface configured to communicate data over a network;
   a vendor database configured to retrievably store vendor data related to a vendor of interest; and
   a processing circuit comprising a processor and memory, the memory structured to store instructions that are executable by the processor and cause the processing circuit to:
   parse data from a pre-approved unstructured internet-accessible data resource;
   generate a searchable external data resource comprising the data structured according to a predetermined format;
   generate a plurality of internal data resources comprising a searchable internal data resource and a hidden privacy-preserving internal data resource;
   generate a unified data repository in the vendor database, the unified data repository comprising the searchable external data resource and the plurality of internal data resources;
   identify the vendor of interest based on an electronically generated internal document;
   identify an author of the electronically generated internal document;
   obtain the vendor data related to the vendor of interest, comprising operations to:
   generate a search term by using machine learning to parse the pre-approved unstructured internet-accessible data resource to determine common misspellings of a name of the vendor of interest; and
   search the plurality of internal data resources and the searchable external data resource with the generated search term, wherein the hidden privacy-preserving internal data resource is unavailable to search;
   store the vendor data and the electronically generated internal document in the vendor database;
   generate a vendor performance score based on the vendor data;
   generate a semantic summary regarding the vendor of interest based on the vendor data, comprising using machine learning to translate at least one quantitative aspect of the vendor data into a natural language summary included in the semantic summary; and
   transmit a vendor scorecard to a computing device associated with the author of the electronically generated internal document, the vendor scorecard comprising:
   the vendor performance score; and
   a semantic summary widget comprising the semantic summary.

2. The computing system of claim 1, wherein:
   The searchable external data resource comprises at least one of a crowdsourced review platform, a blog, a news source, a business data aggregator, and a social media platform; and
   the plurality of internal data resources comprises at least one of an email, a calendar entry, a contract, a slideshow, a report, an accounting record, an invoice, a letter, a phone call history, or a vendor evaluation form.

3. The computing system of claim 1, wherein the vendor scorecard further comprises a related vendors widget, a relationships widget, a quotes and facts widget, and a graphical visualization of the vendor performance score.

4. The computing system of claim 1, wherein the processing circuit is further caused to identify the vendor of interest by monitoring email traffic and detecting an email that mentions the name of a vendor.

5. A method, comprising:
parsing, by a computing system, data from a pre-approved unstructured internet-accessible data resource;
generating a searchable external data resource comprising the data structured according to a predetermined format;
generating a plurality of internal data resources comprising a searchable internal data resource and a hidden privacy-preserving internal data resource;
generating a unified data repository in a vendor database, the unified data repository comprising the searchable external data resource and the plurality of internal data resources;
identifying, by the computing system, a new mention of a vendor of interest, the vendor of interest mentioned in a new internal document created by an author;
obtaining vendor data related to the vendor of interest, comprising operations to:
generate a search term by using machine learning to parse the pre-approved unstructured internet-accessible data resource to determine common misspellings of a name of the vendor of interest; and
search the plurality of internal data resources with the generated search term, wherein the hidden privacy-preserving internal data resource is unavailable to search;
searching, by the computing system, the searchable external data resource for external data corresponding to the vendor;
saving the vendor data and the new internal document in the vendor database;
analyzing, by the computing system, the vendor data to generate a vendor performance score;
generate a semantic summary regarding the vendor of interest based on the vendor data, comprising using machine learning to translate at least one quantitative aspect of the vendor data into a natural language summary included in the semantic summary; and
generating, by the computing system, a user interface configured to display a vendor scorecard to the author of the new internal document, the vendor scorecard comprising:
the vendor performance score; and
a semantic summary widget comprising the semantic summary.

6. The method of claim 5, wherein searching the searchable internal data resource for internal data with the generated search term comprises:
generating internal search criteria;
accessing the searchable internal data resource stored in the unified data repository; and
applying the internal search criteria to the searchable internal data resource to identify internal data that meet the internal search criteria.

7. The method of claim 6, wherein searching the searchable external data resource for external data corresponding to the vendor comprises:
generating external search criteria;
accessing the searchable external data resource over a network via a network interface;
applying the external search criteria to the searchable external data resource to identify external data that meet the external search criteria.

8. The method of claim 7, wherein the searchable external data resource comprises at least one of a crowdsourced review platform, a blog, a news source, a business data aggregator, and a social media platform.

9. The method of claim 8, wherein the plurality of internal data resources comprises at least one of an email, a calendar entry, a contract, a slideshow, a report, an accounting record, an invoice, a letter, a phone call history, or a vendor evaluation form.

10. An apparatus, comprising:
a network interface;
a processing circuit comprising a processor and memory, the memory structured to store instructions that are executable by the processor and cause the processing circuit to:
parse data from a pre-approved unstructured internet-accessible data resource;
generate a searchable external data resource comprising the data structured according to a predetermined format;
generate a plurality of internal data resources comprising a searchable internal data resource and a hidden privacy-preserving internal data resource;
generate a unified data repository in a vendor database, the unified data repository comprising the searchable external data resource and the plurality of internal data resources;
store a list of one or more vendors;
monitor new internal documents and detect a relevant internal document that mentions a vendor of interest from the list of one or more vendors;
obtain vendor data related to the vendor of interest, comprising operations to:
generate a search term by using machine learning to parse the pre-approved unstructured internet-accessible data resource to determine common misspellings of a name of the vendor of interest; and
search the plurality of internal data resources and the searchable external data resource with the generated search term, wherein the hidden privacy-preserving internal data resource is unavailable to search;
store the relevant internal document;
identify an author of the relevant internal document;
determine a vendor performance score for the vendor of interest;
generate a semantic summary regarding the vendor of interest based on the vendor data, comprising using machine learning to translate at least one quantitative aspect of the vendor data into a natural language summary included in the semantic summary; and
provide the author of the relevant internal document with a vendor scorecard comprising:
the vendor performance score, and
a semantic summary widget comprising the semantic summary.

11. The apparatus of claim 10, wherein the new internal documents comprise at least one of an email, a calendar entry, a contract, a slideshow, a report, an accounting record, an invoice, a letter, a phone call history, or a vendor evaluation form.

12. The apparatus of claim 11, wherein the processing circuit is further caused to determine a vendor performance score for the vendor of interest by:
   searching the searchable internal data resource for internal data corresponding to the vendor of interest;
   searching the searchable external data resource for external data corresponding to the vendor of interest;
   aggregating the relevant internal document, the internal data, and the external data in a vendor database;
   analyzing the relevant document, the internal data, and the external data in the vendor database to generate the vendor performance score.

13. The apparatus of claim 11, wherein the processing circuit is further caused to determine the vendor performance score for the vendor of interest by accessing a stored vendor performance score in the vendor database.

14. The apparatus of claim 13, wherein the processing circuit is further caused to determine the vendor performance score for the vendor of interest by additionally updating the vendor performance score by:
   searching the searchable internal data resource for internal data corresponding to the vendor of interest;
   searching the searchable external data resource for external data corresponding to the vendor of interest;
   saving the internal data and the external data in a vendor database;
   analyzing the relevant document, the internal data, and the external data in the vendor database to update the vendor performance score.

15. The apparatus of claim 14, wherein the processing circuit is further caused to:
   determine whether the vendor performance score is below an acceptable threshold value; and
   in response to a determination that the vendor performance score is below the acceptable threshold value, notify the author of the relevant internal document that the vendor performance score is below the acceptable threshold value.

16. The apparatus of claim 15, wherein the processing circuit is further caused to provide the author of the relevant internal document with the vendor performance score by generating a vendor performance scorecard that comprises a visualization of the vendor performance score.

* * * * *